US011308331B2

(12) United States Patent
Iyer

(10) Patent No.: US 11,308,331 B2
(45) Date of Patent: Apr. 19, 2022

(54) MULTIMEDIA CONTENT SUMMARIZATION METHOD AND SYSTEM THEREOF

(71) Applicant: Wipro Limited, Bangalore (IN)

(72) Inventor: Manjunath Ramachandra Iyer, Bangalore (IN)

(73) Assignee: Wipro Limited, Bangalore (IN)

( * ) Notice: Subject to any disclaimer, the term of this patent is extended or adjusted under 35 U.S.C. 154(b) by 247 days.

(21) Appl. No.: 16/796,069

(22) Filed: Feb. 20, 2020

(65) Prior Publication Data

US 2021/0201045 A1  Jul. 1, 2021

(30) Foreign Application Priority Data

Dec. 31, 2019  (IN) .............................. 201941054629

(51) Int. Cl.
  *G06K 9/00*  (2006.01)
  *H04N 21/8549*  (2011.01)
  *G06K 9/62*  (2022.01)
(52) U.S. Cl.
  CPC ..... *G06K 9/00751* (2013.01); *G06K 9/00718* (2013.01); *G06K 9/6256* (2013.01); *H04N 21/8549* (2013.01); *G06K 2009/00738* (2013.01)
(58) Field of Classification Search
  CPC .......... G06K 9/00718; G06K 9/00751; G06K 9/6256; G06K 2009/00738; G06F 16/739; H04N 21/8549
  See application file for complete search history.

(56) References Cited

U.S. PATENT DOCUMENTS

| 5,864,366 A | 1/1999 | Yeo | |
|---|---|---|---|
| 10,229,324 B2* | 3/2019 | Hwangbo | G06N 3/0454 |
| 2004/0181545 A1* | 9/2004 | Deng | G11B 27/105 |
| 2006/0165379 A1* | 7/2006 | Agnihotri | H04N 21/8453 |
| | | | 386/231 |
| 2018/0225519 A1* | 8/2018 | Chen | G06K 9/00751 |

OTHER PUBLICATIONS

Liu, T. et al., "Disruption-Tolerant Content-Aware Video Streaming", MM 2014, 4 pages.

* cited by examiner

*Primary Examiner* — Daniel G Mariam
(74) *Attorney, Agent, or Firm* — Finnegan, Henderson, Farabow, Garrett & Dunner, LLP

(57) ABSTRACT

A method and system for summarizing multimedia content is disclosed. The method includes the steps of extracting a set of video files from a multimedia content such that each of the set of video files comprises a plurality of frames, and summarizing each of the set of video files to generate a set of summarized video files. Summarizing includes modifying a number of frames in each of the set of video files while retaining a caption generated for each of the set of video files. The method further includes generating sets of bridge frames for the set of summarized video files, based on a deep learning model. A set of bridge frames from the sets of bridge frames maintains continuity between corresponding adjacent summarized video files. The method includes generating a summarized multimedia content based on the set of summarized video files and the sets of bridge frames.

23 Claims, 10 Drawing Sheets

| | Video File 1 | Video File 2 | Video File 3 | Video File 4 |
|---|---|---|---|---|
| Iteration 0 | 1-500 | 501-1100 | 1101-1500 | 1501-1900 |
| Iteration 1 | 1-84<br>168-290<br>423-483 | 501-620<br>726-840<br>1021-1087 | ... | ... |
| Iteration 2 | 1-32<br>48-82<br>180-250<br>440-480 | ... | ... | ... |
| Iteration 3 | ... | | | |
| Iteration 4 | ... | | | |

MULTIMEDIA CONTENT SUMMARIZATION METHOD AND SYSTEM THEREOF

TECHNICAL FIELD

The present invention relates to content summarization systems. In particular, the present invention relates to a multimedia content summarization method and system thereof.

BACKGROUND

In recent years, network technology and wireless environment have gained a lot of attention. The advancement in digital technology, for example, Multiple Input Multiple Output (MIMO), and 5G, increased the number of applications utilizing multimedia content, such as, a result of increased use of mobiles. There is a widespread use of wireless media for transmitting multimedia content for a variety of applications and networks. The multimedia content requires high bandwidth for transmission, and the existing models do not offer any method, for applications, to meet such high bandwidth conditions with availability of limited network resources. The existing models also do not provide any solution for controlling data transmission at such high rates, as uncontrolled transmission of data at high rates may lead to heavy congestion over communication channel in the network.

Wireless transmission has many benefits, however the rate of multimedia content transmission over wireless networks has some limitations. Sometimes, the frames of the multimedia content transmitted over wireless networks get frozen due to the lack of adequate bandwidth, resulting in loss of synchronization between video and audio content. Therefore, it is required to compress the video content before transmitting it over communication channel, especially to avert the congestion in communication channels.

Some conventional methods provide methodologies for summarizing video content, for example, static summarization method and dynamic summarization method. In the static summarization method, the main frames are extracted from multiple sections of a video and then merged in a sequence to form a kind of story-board. On other hand, in the dynamic summarization method, the video is segregated into small video units, followed by selection and combination of essential video units to generate a fixed-duration summary.

However, the conventional methods discussed above do not provide optimal transmission of content as the instantaneous resource availability are not considered in these conventional methods as these conventional methods considered consistent good channel strength. Additionally, summarization of audio and video content independently without considering the channel parameters may result in loss of synchronization. The conventional methods for transmitting multimedia content, reduces bit rate and provide a significant part of the content, but they are not capable of maintaining quality of the content. Thus, the conventional methods for multimedia content summarization do not continuously provide high quality content with acceptable reduction in content even with reduced resources.

SUMMARY

In one embodiment, a method for summarizing multimedia content is disclosed. In one embodiment, the method may include extracting, by a content summarization device, a set of video files from a multimedia content, wherein each of the set of video files comprises a plurality of frames. The method may further include summarizing, by the content summarization device, each of the set of video files to generate a set of summarized video files. Further, summarizing the set of video files comprises modifying a number of frames in each of the set of video files, wherein modifying the number of frames in a video file from the set of video files retains a caption generated for the video file. The method may further include generating, by the content summarization device, sets of bridge frames for the set of summarized video files, based on a deep learning model, wherein a set of bridge frames from the sets of bridge frames maintains continuity between corresponding adjacent summarized video files. The method may further include generating, by the content summarization device, a summarized multimedia content based on the set of summarized video files and the sets of bridge frames.

In another embodiment, a method for summarizing multimedia content is disclosed. The method includes extracting, by a content summarization device, a set of video files and a corresponding set of audio files from a multimedia content. Each of the set of video files includes a plurality of frames. The method further includes summarizing, by the content summarization device, each of the set of video files to generate a set of summarized video files and each of the set of audio files to generate a set of summarized audio files. Summarizing the set of video files includes modifying a number of frames in each of the set of video files. Modifying the number of frames in a video file from the set of video files retains a caption generated for the video file. Summarizing an audio file from the set of audio files includes converting each the audio file into text, parsing the text associated with the audio file to identify at least one subject and interaction of the at least one subject with at least one object, based on natural language processing techniques, and summarizing the audio file based on the identification of the least one subject and interaction of the at least one subject with the at least one object. The method includes synchronizing, by the content summarization device, each of the set of summarized audio files with a corresponding summarized video file from the set of summarized video files. A summarized audio file from the set of summarized audio files defines boundary of a corresponding summarized video file.

In yet another embodiment, a system for summarizing multimedia content is disclosed. The system includes a processor and a memory communicatively coupled to the processor, wherein the memory stores processor instructions, which, on execution, causes the processor to extract a set of video files from a multimedia content, such that each of the set of video files comprises a plurality of frames. The processor instructions further cause the processor to summarize each of the set of video files to generate a set of summarized video files, such that summarizing the set of video files includes modifying a number of frames in each of the set of video files, and wherein modifying the number of frames in a video file from the set of video files retains a caption generated for the video file. The processor instructions further cause the processor to generate sets of bridge frames for the set of summarized video files, based on a deep learning model, such that a set of bridge frames from the sets of bridge frames maintains continuity between corresponding adjacent summarized video files. The processor instructions further cause the processor to generate a summarized multimedia content based on the set of summarized video files and the sets of bridge frames.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims. Additional illustrative embodiments are listed below.

Figure 1:
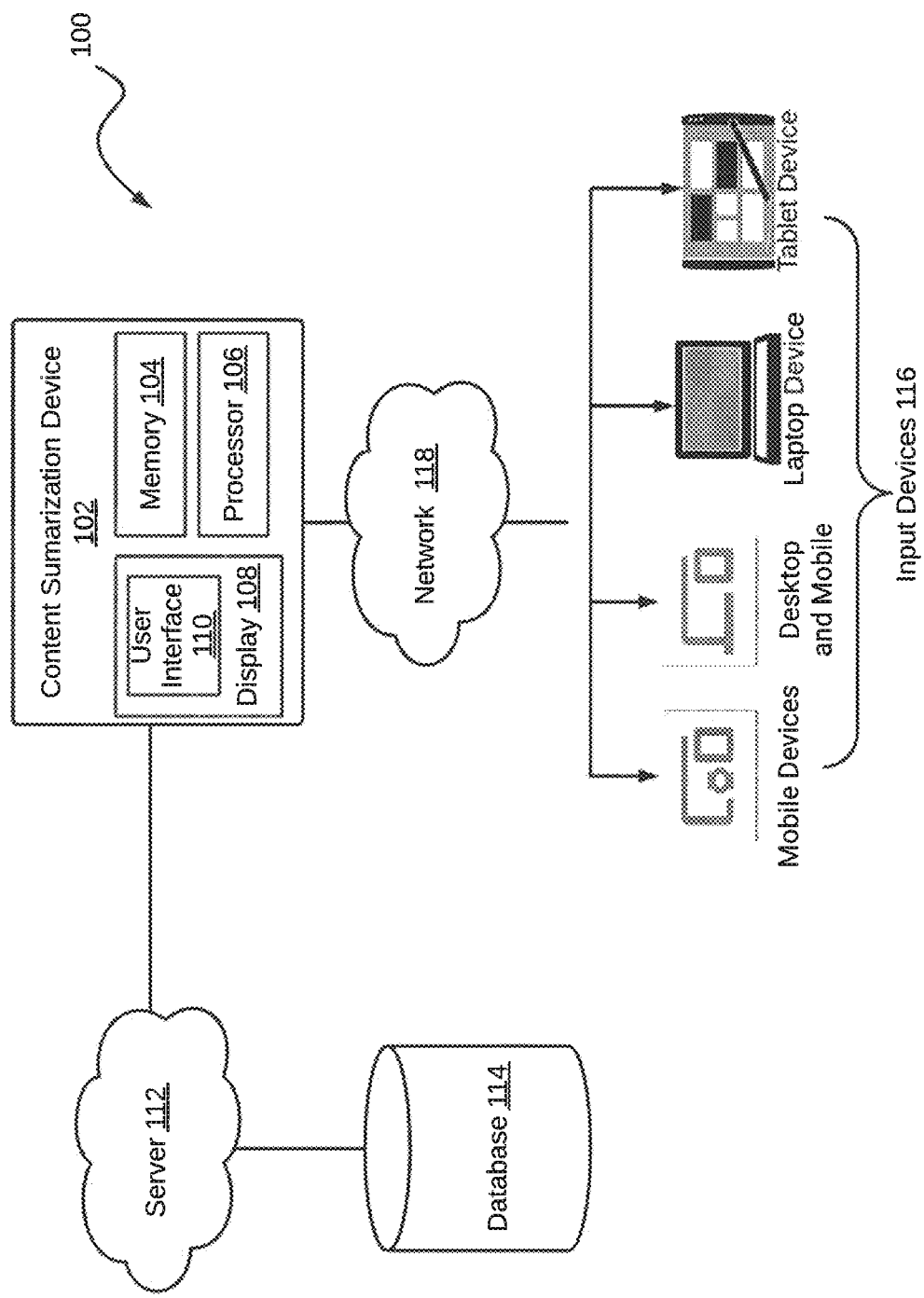
FIG. 1 is a block diagram of a system for summarizing multimedia content, in accordance with an embodiment.

In one embodiment, a system 100 for summarizing multimedia content is illustrated in the FIG. 1, in accordance with an embodiment. The multimedia content may include audio content and video content that is required to an end user over a communication channel. Examples of the multimedia content, may include, but are not limited to entertainment video content, archived documentaries, video clips, augmented reality data, virtual reality data, holographic imaging data, or video surveillance. In an embodiment, the system 100 may be used to resolve a problem of congestion over the communication channel, using a content summarization device 102. The content summarization device 102 summarizes the multimedia content by removing redundant features from the multimedia content, thereby generating a summarized multimedia content. The content summarization device 102 performs this summarization without compromising with the quality of the multimedia content. Examples of the content summarization device 102 may include, but are not limited to, a server, a desktop, a laptop, a notebook, a netbook, a tablet, a smartphone, a mobile phone, an application server, or the like.

The content summarization device 102 may iteratively summarize the multimedia content, in order to achieve maximum possible summarization without compromising with quality of the multimedia content. The content summarization device 102 may include a memory 104, a processor 106, and a display 108. The display 108 may further include a user interface 110. A user or an administrator may interact with the content summarization device 102 and vice versa through the display 108. By way of an example, the display 108 may be used to display results of analysis performed by the content summarization device 102, to the user. By way of another example, the user interface 110 may be used by the user to provide inputs to the content summarization device 102.

As will be described in greater detail in conjunction with FIG. 2 to FIG. 10, in order to summarize the multimedia content, the content summarization device 102 may extract the multimedia content from a server 112, which is further communicatively coupled to a database 114. The memory 104 and the processor 106 of the content summarization device 102 may perform various functions including segregation, summarization, and synchronization.

The memory 104 may store instructions that, when executed by the processor 106, cause the processor 106 to summarize the multimedia content in a particular way. The memory 104 may be a non-volatile memory or a volatile memory. Examples of non-volatile memory, may include, but are not limited to a flash memory, a Read Only Memory (ROM), a Programmable ROM (PROM), Erasable PROM (EPROM), and Electrically EPROM (EEPROM) memory. Examples of volatile memory may include but are not limited to Dynamic Random Access Memory (DRAM), and Static Random-Access memory (SRAM).

The multimedia content may also be received by the content summarization device 102 from one or more of a plurality of input devices 116. Examples of the plurality of input devices 116 may include, but are not limited to a desktop, a laptop, a notebook, a netbook, a tablet, a smartphone, a remote server, a mobile phone, or another computing system/device. The content summarization device 102 may summarize the multimedia content thus received and may then share the summarized multimedia content with one or more of the plurality of input devices 116. The plurality of input devices 116 may be communicatively coupled to the content summarization device 102, via a network 118. The network 118 may be a wired or a wireless network and the examples may include, but are not limited to the Internet, Wireless Local Area Network (WLAN), Wi-Fi, Long Term Evolution (LTE), Worldwide Interoperability for Microwave Access (WiMAX), and General Packet Radio Service (GPRS).

Figure 2:
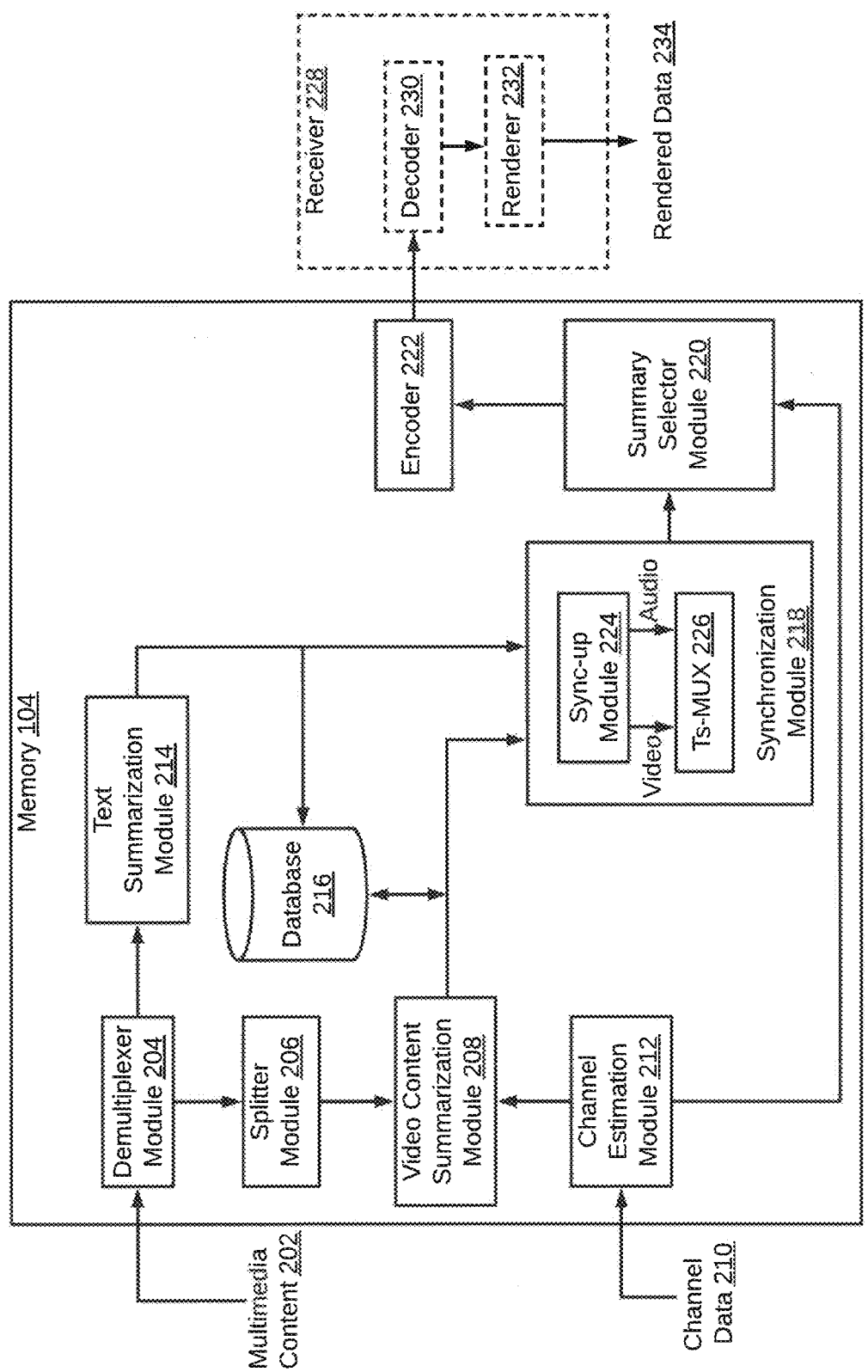
FIG. 2 is a block diagram of various module within a memory of a content summarization device configured to summarize multimedia content, in accordance with an embodiment.

Referring now to FIG. 2, a block diagram of various module within the memory 104 of the content summarization device 102 configured to summarize multimedia content is illustrated, in accordance with an embodiment. The content summarization device 102 may be provided within a transmitter (not shown in FIG. 2), in order to generate a summarized multimedia content for transmission based on a multimedia content 202 received by the content summarization device 102. The memory 104 of the content summarization device 102 may include various modules for performing multiple functions to provide summarized multimedia content. The modules within the memory 104 of the content summarization device 102 may include a demultiplexer module 204, a splitter module 206, a video content summarization module 208, a channel estimation module 212, a text summarization module 214, a database 216, a synchronization module 218, a summary selector module 220, and an encoder 222. The synchronization module 218 may further includes a sync-up module 224 and a Ts-MUX 226.

The encoder 222 may share the summarized multimedia content with a receiver 228, which may include a decoder 230 and a renderer 232. The receiver 228, for example, may be one of the plurality of input devices 116.

The multimedia content 202 received by the content summarization device 102 is fed to the demultiplexer module 204. The demultiplexer module 204 may be configured to receive the multimedia content 202 and segregate the multimedia content 202 into a video content and an audio content. To this end, the demultiplexer module 204 may employ a time stamp mapping technique. The demultiplexer module 204 is communicatively connected to the splitter module 206 and the text summarization module 214, such that, the demultiplexer module 204 sends the video content to the splitter module 206 and directs the audio content towards the text summarization module 214.

After the splitter module 206 receives the video content, the splitter module 206 splits the video content into a plurality of video files, such that, each of the video files includes a plurality of frames. The splitter module 206 analyzes context of each frame in the video content by performing various iterations on it. The splitter module 206 may iteratively determine one or more change in context of the video content based on comparison of adjacent frames within the video content. The change in context corresponds to difference between adjacent frames being greater than a predefined threshold. In another embodiment, the change in context may correspond to the context similarity between adjacent frame being less than a predefined threshold. The value of the predefined threshold may be selected from a range of 0 to 100% and the predefined threshold may vary based on requirements of the system 100. The splitter module 206 further transmits the plurality of video files to the video content summarization module 208.

The video content summarization module 208 may be communicatively interlinked between the splitter module 206 and the channel estimation module 212. The video content summarization module 208 may summarize each of the plurality of video files based on different congestion statuses of a communication channel on which the plurality of video files may be transmitted post summarization. In order to determine a future congestion status of the communication channel, the channel estimation module 212 receives the channel data 210. The channel data 210 may include information acquired from the communication channel that may indicate the parameters affecting congestion status of the communication channel. In one embodiment, the parameters include Random Early Detection (RED) signal that may be generated by routers and may represent packet loss probability. After receival of the channel data 210, the channel estimation module 212 estimates or predicts the congestion status of the communication channel for near future time. The channel estimation module 212 may use deep learning model including a Multilayer Perceptron (MLP) model, a Long Short-Term Memory (LSTM) model, a Convolutional Neural Network (CNN) model, a Recursive Neural Network (RNN) model, or a Recurrent Neural Network (RNN) model for estimating the status of the communication channel. An adequate amount of time is provided in the system 100 between the estimation of channel status and summarization of the video files, in order to select correct degree of summarization.

The channel estimation module 212 transmits the predicted channel status to the video content summarization unit 208. After receiving the predicted channel status from channel estimation module 212 and a set of video files from the splitter module 206, the video content summarization module 208 determines a degree of summarization for each of the plurality of video files based on the estimated channel status. Each of the video files may be independently summarized by modifying frames of each of the video files. The modification in the number of frames for a video files retains a caption generated for the video file, by using a caption generating mechanism, for example, CoCo. In an embodiment, to modify number of frames for a video file, frames may be added and/or removed from the video files to summarize the video file, such that, the frames are added or removed until the caption generated for the video file is retained. The video content summarization unit 208 may also generate multiple sets of bridge frames, and these sets of bridge frames are interleaved between two adjacent summarized video files in order to maintain the continuity in the summarized video content. The summarized video content may be stored in the database 216 or may be directly transmitted to the synchronization unit 218.

With regards to the audio content, the text summarization module 214 accepts the audio content transmitted by the demultiplexer module 204. In the text summarization module 214, the audio content is converted into text form using a text to speech converter. Thereafter, an analysis may be performed on the text corresponding to the audio content in order to identify at least one subject and interaction of the at least one subject with at least one object, by using an Natural Language Processing (NLP) technique. Finally, the text summarization module 214 summarizes the audio content based on the identification of at least one subject and interaction of the at least one subject with the at least one object. The summarized audio content is stored on the database 216 or may directly be shared with the synchronization module 218.

The database 216 stores various tables including sets of summarized frames, degree of summarization, bridge frames generated during summarization, and the summarized audio and video content. The database 216 is required to support high speed access as the summarized audio and video content needs to be selected in near real-time and put over the communication channel for transmission.

The synchronization module 218 receives the summarized audio as well as the summarized video content and ensures that the video content and the associated audio content are intact and ending at the correct boundaries. In other words, audio should not stop abruptly at the middle of an audio sentence. To this end, the synchronization module 218 includes the sync-up module 224 that synchronizes the summarized video files and the corresponding audio files with the consideration of sentence boundaries within the summarized video frames or translates the audio to words to recognize the boundaries. Further, the TS-Mux 226, present inside the synchronization unit 218 is a transport stream multiplexer that merges the synchronized audio/text and video along with time stamps into a transport stream that is ready for transmission.

The summary selector module 220 receives the synchronized audio and video content from the synchronization module 218 as well as information of channel status from the channel estimation module 212. Based on the received information, the summary selector module 220 selects appropriate summarized content to be transmitted to the receiver 228. The summary selector module 220 then transmits the selected summarized multimedia content to the encoder 222. The encoder 222 then transfers the summarized multimedia content over the communication channel after adding the required headers and subsequently modulating the same. In an embodiment, the encoder 222 may use the OFDM technique for modulating the summarized multimedia content.

Now, on other side, i.e., the receiver 228, the decoder 230 receives the summarized multimedia content transmitted via the communication channel. The decoder 230 performs a reverse operations to that of the encoder 222, i.e., the decoder 230 decodes the summarized multimedia content by utilizing OFDM demodulation technique, for example. The decoded and summarized multimedia content is then fed to the renderer 232 that formats the summarized multimedia content and renders it as rendered data 234 via a user interface (for example, the user interface 110) for consumption by a user.

As the multimedia content 202 requires large bandwidth for transmission, and one of the solutions to overcome the aforementioned problem is to summarize the content, the content summarization device 102 is designed to transmit the summarized multimedia content, depending upon the various constraints including number of resources, number of connected users, or priority, in order to avoid problems that may occur due to congestion in the communication channel.

Figure 3:
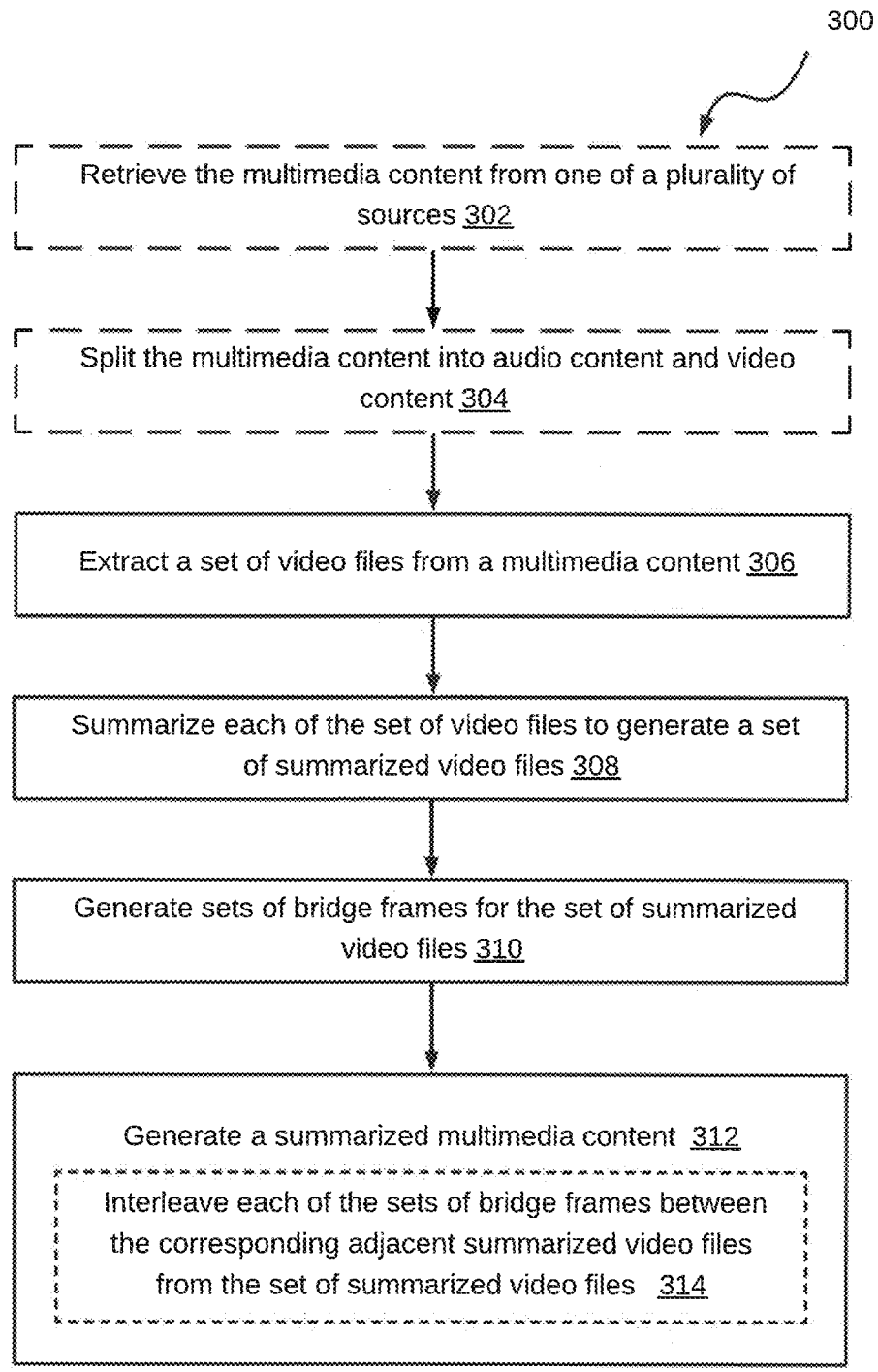
FIG. 3 is a flowchart of a method for summarizing video content, in accordance with an embodiment.

Referring now to FIG. 3, a flowchart 300 of a method for summarizing a multimedia content is illustrated, in accordance with an embodiment. The content summarization device 102 may summarizes the multimedia content to avoid and overcome bandwidth constraints caused due to congestion in a communication channel that may be used to transmit the multimedia content. At step 302, the content summarization device 102 may retrieve the multimedia content (for example, the multimedia content 202) from one of a plurality of sources. The plurality of sources have been explained in detail in conjunction with FIG. 1. Thereafter, at step 304, the content summarization device 102 splits the multimedia content into an audio content and a video content.

At step 306, the content summarization device 102 extracts a set of video files from the multimedia content. In an embodiment, the content summarization device 102 may extract the set of video files from the video content obtained after splitting the multimedia content. Each of the set of video files may include a plurality of frames. The method for extraction of the set of video files is explained in detail in conjunction with FIG. 7. Thereafter, at step 308, the content summarization device 102 may summarize each of the set of video files to generate a set of summarized video files. It may be note that, the summarization of each video file is implemented independently. In other words, summarization of a given video file does not depend upon summarization of others video files. The content summarization device 102 may summarize the set of video files by modifying a number of frames in each of the set of video files. To this end, for each video file, a caption is generated using a caption generating technique, for example, CoCo. Thereafter, a video file from the set of video files is modifies, such that, the modification retains the caption generated for the video file. The method of frames modification is further explained in detail in conjunction with FIG. 4.

At step 310, the content summarization device 102 generates sets of bridge frames for the set of summarized video files. The content summarization device 102 may employ a deep learning model to generate the sets of bridge frames. The sets of bridge frames may be used to eliminate the problem of discontinuity that generally occurs in a video content after summarization process. In other words, the generation of sets of bridge frames between corresponding adjacent summarized video files helps in maintaining the continuity of the summarized video.

At step 312, the content summarization device 102 generates a summarized multimedia content by utilizing the set of summarized video files and the sets of bridge frames. The step 312 further includes a step 314, where, the content summarization device 102 interleaves (or inserts) each of the sets of bridge frames between the corresponding adjacent summarized video files from the set of summarized video files. This is further explained in detail in conjunction with FIG. 6.

Figures 4, 5:
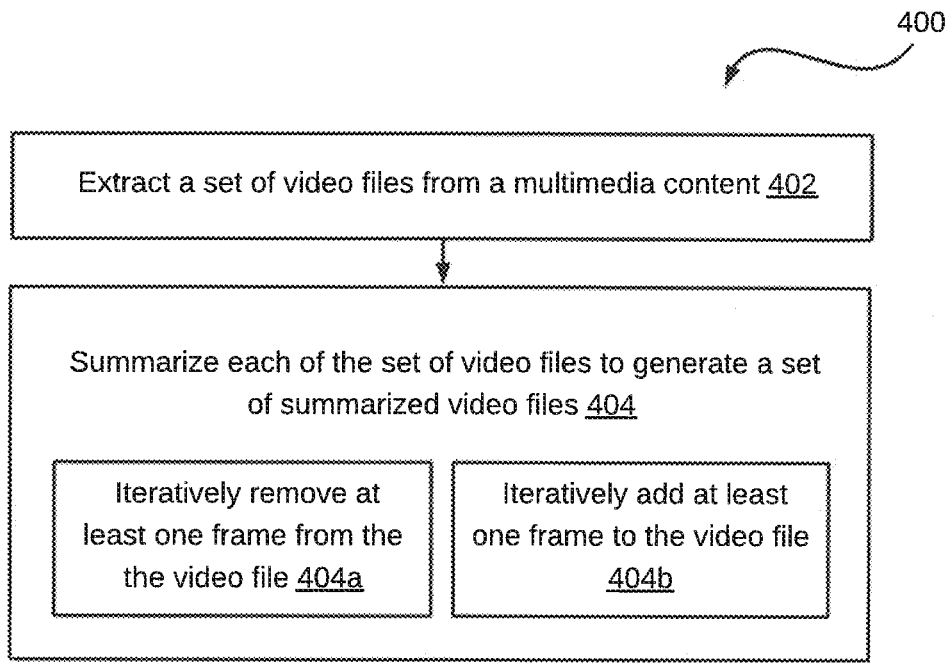
FIG. 4 illustrates a flowchart of a method for summarizing a video file to generate a summarized video file by modifying number of frames in the video file, in accordance with an embodiment.
FIG. 5 illustrates a table representing stored summarized frames for a video file at various iterations of summarization, in accordance with an exemplary embodiment.

Referring now to FIG. 4, a flowchart of a method for summarizing a video file to generate a summarized video file by modifying number of frames in the video file is illustrated, in accordance with an embodiment. At step 402, a set of video files are extracted from a multimedia content. Thereafter, at step 404, each of the set of video files are summarized to generate a set of summarized video files. This has already been explained in detail in conjunction with FIG. 3. The step 404 further includes a step 404a and a step 404b. It may be noted that at a given time, one or more of the steps 404a and 404b may be executed. A caption (which may be a contextual caption) may be generated for a video file by using a caption generating technique, for example, CoCo. At step 404a, one or more frames may be removed from the video file iteratively till the caption associated with the video file is maintained. The frames are removed systematically from the end of the video file until the change in the caption is encountered. This ensures that the truncated or summarized video conveys the same context to the user as indicated by the caption.

In contrast to the step 404a, at the step 404b, one or more frames are added to the video file iteratively till the caption associated with the video file is generated. As discussed above, the steps 404a and 404b may be concatenated or executed in parallel, i.e., one or more frames may be added in a forward direction and one or more frames may be deleted from a reverse direction until the same caption of the video file is maintained.

Referring now to FIG. 5, a table 500 representing stored summarized frames for a video content at various iterations of summarization is illustrated, in accordance with an exemplary embodiment. Rather than storing the summarized video files, for a given video file, the summarized frame numbers in each of the iteration for the video file are stored in a database (for example, the database 216), as depicted in the table 500. An example of total four video files extracted from a video content is considered, as depicted in the table 500. In the iteration 0, the first 500 frames (i.e., frames 1 to 500) are considered as a first video file 1 (video file 1), next 600 frames (i.e., frames 501 to 1100) as a second video file (video file 2), next 400 frame (i.e., frames 1101 to 1500) as the third video file 3 (video file 3), and last 400 frames (i.e., frames 1501 to 1900) as a fourth video file (video file 4). Thus, in the iteration 0, all the frames of each of the four video files are present, i.e., there may not be any modification in the frames of any of the video files. In iteration 1, for example, frames 85-167, 291-422, and 484-500 are removed from the first video file and frames 501-620, 726-840, and 1021-1087 are removed from the second video file. Similarly, as depicted in table 500, in each subsequent iteration, additional frames are removed from each of the four video files based on the caption generation method as described in FIG. 4. It will be apparent that each subsequent iteration represented in the table 500 corresponds to a higher degree of summarization of each of the four video files.

Figure 6:
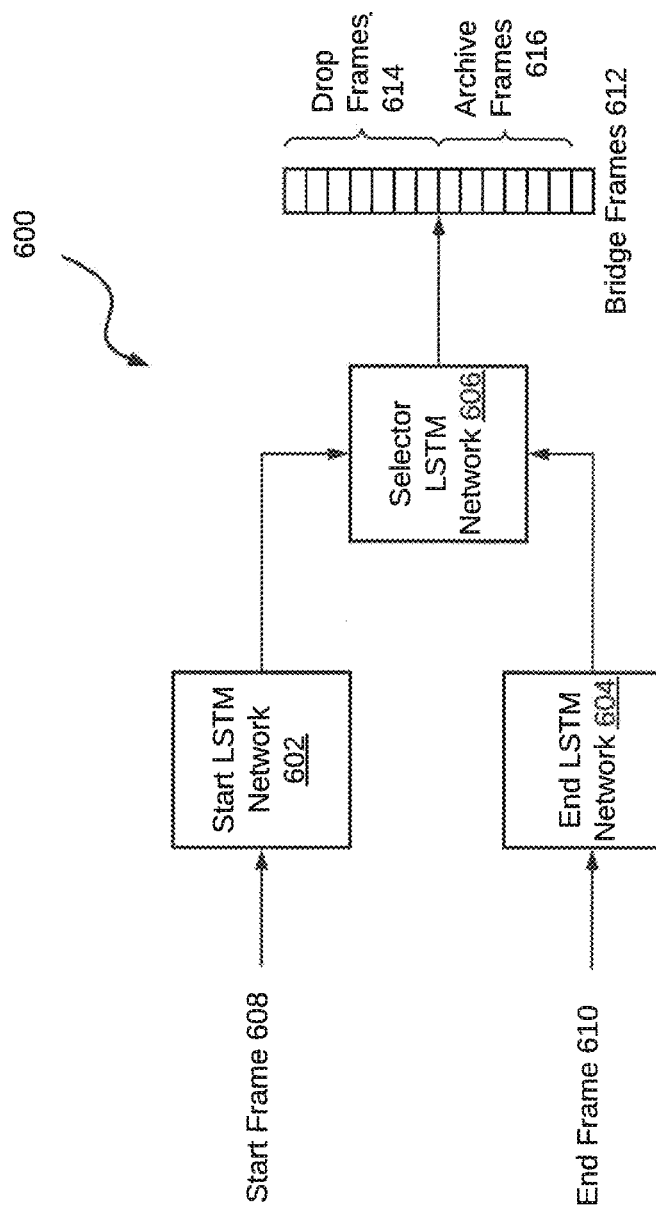
FIG. 6 illustrates a system that includes Long Short Term Memory (LSTM) networks for generating bridge frames, in accordance with an exemplary embodiment.

Referring now to FIG. 6, a system 600 that includes Long Short Term Memory (LSTM) networks for generating bridge frames is illustrated, in accordance with an embodiment. When the summarized multimedia content is transmitted to the user, the user may find discontinuity in the video and may experience jerking between an ending frame of one video file and starting frame of an adjacent video file. This jerking or discontinuity in the summarized video content may occur because of independent summarization of each video file by modifying the number of frames. By way of an example and referring back to table 500, based on availability of resources and current congestion in the communication channel, a current transmission may require iteration 1 for the first video file (ending with frame 483) and iteration 0 for the second video file (starting with frame 501). The bridge frames are generated using one or more LSTM networks to maintain continuity on either side of the first video file and the second video file (i.e., a few frames after the frame 483 and a few frames before the frame 501).

The system 600 may include two LSTM networks, i.e., a start LSTM network 602 and an end LSTM network 604. The system 600 may further include a selector LSTM network 606. As depicted, in the system 600, features of a start frame 608 are fed into the start LSTM network 602 and features of the end frame 610 are fed into the end LSTM network 604. Based on the received features, the start LSTM network 602 and the end LSTM network 604 generate bridge frames between the start frame 608 and the end frame 610. The features of the start frame 608 and the end frame 610 may be generated through an auto-encoder (not shown in FIG. 6). The selector LSTM network 606 may be interlinked between the start LSTM network 602 and the end LSTM network 604. The selector LSTM network 606 ensures the contiguousness of the discarded or archived frames. The selector LSTM network 606 also prevents archiving of spurious frames. By way of an example, amongst the bridge frames 612, may select some frame as drop frames 614 (which would be dropped) and other frames as archive frame 616 (which may be archived). Thus, bridge frame generation as performed by the system 600 may be a tradeoff between ease of congestion control and may be enforced as a part of Service Level Agreement (SLA).

In an embodiment, multiple bridges may be formed between two consecutive video files. By way of an example and referring back to the table 500, the iteration 1 is considered for the first video file and the iteration zero is considered for the second video file. In this case, the system 600 may generate bridge frames 488 to 496.

Figure 7:
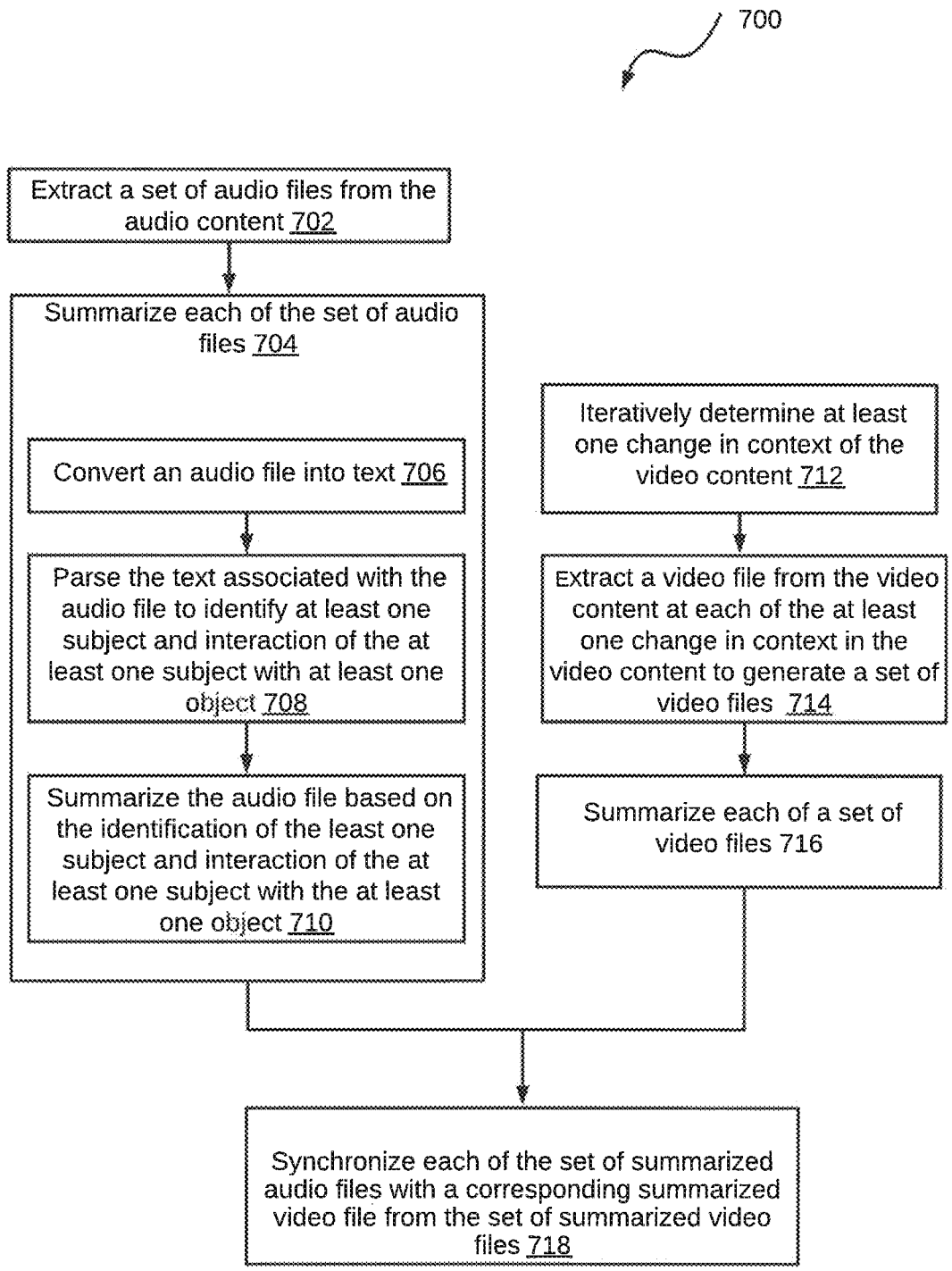
FIG. 7 illustrates a flowchart of a method for summarizing a multimedia content, in accordance with an embodiment.

Referring now to FIG. 7, a flowchart 700 of a method for summarizing a multimedia content is illustrated, in accordance with an embodiment. At step 702, a set of audio files are extracting from the multimedia content (for example, the multimedia content 202). Thereafter, at step 704 each of the set of audio files is summarized to generate a set of summarized audio files. The summarization of the set of audio files further includes steps 706, 708, and 710. At step, 706 of the audio summarization, each an audio file may be converted into text form. This conversion may be performed using a speech to text converter (for example, Natural Language Processing (NLP) techniques. At step 708, the text associated with the audio file is parsed to identify one or more subjects and interaction of the one or more subjects with one or more objects, using NLP techniques. At step 710, the audio file is summarized, according to recognized one or more subjects and interaction of the one or more subjects with the one or more objects.

Steps 712 to 716 may be executed in parallel to the steps 702 to 710. At step 712, one or more changes in context of the video content may be iteratively determined by comparing adjacent frames within the video content. The change in context is identified when the difference between adjacent frames is greater than a predefined threshold. The predefined threshold value has already been discussed in detail in conjunction with FIG. 2. At step 714, at each of the one or more change in contexts in the video content, a video file is extracted from the video content in order to create the set of video files. At step 716, each of the set of video files extracted from the video content are summarized. This has already been explained in detail in conjunction with FIG. 3, FIG. 4, FIG. 5, and FIG. 6. Each of the steps 704 and 716 are followed by step 718. At step 718, each of the set of summarized audio files may be synchronized with a corresponding summarized video file from the set of summarized video files. The synchronization is performed such that a summarized audio file from the set of summarized audio files defines boundary of a corresponding summarized video file.

Figure 8:
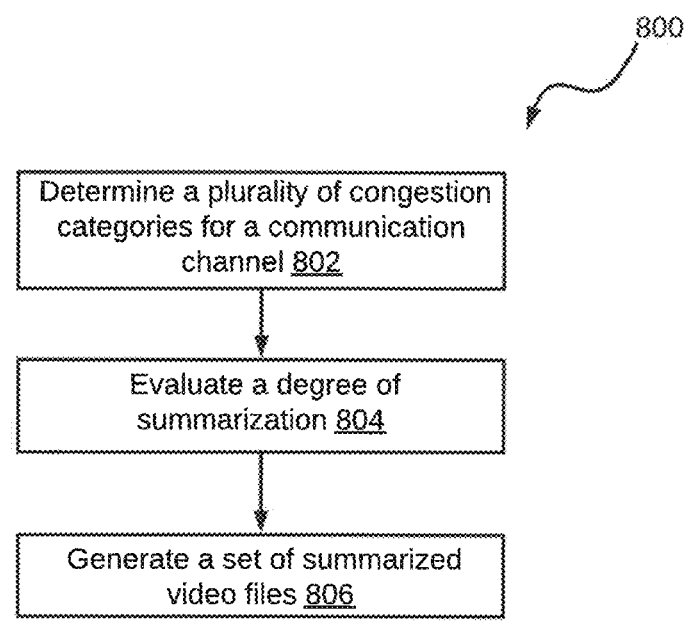
FIG. 8 illustrates a flowchart of a method for generating summarized video files based on relevant congestion category for a communication channel, in accordance with an embodiment.

Referring now to FIG. 8, a flowchart 800 of a method for generating summarized video files based on relevant congestion category for a communication channel is illustrated, in accordance with an embodiment. At step 802, a plurality of congestion categories are determined for a communication channel. Each of the plurality of congestion categories correspond to a congestion status of the communication channel. At step 804, a degree of summarization is evaluated for each of the plurality of congestion categories based on the congestion status of the channel. The degree of summarization generated for each of the plurality of video files may be different. By way of an example, higher is the congestion in a communication channel, greater would be the degree of summarization performed on each of the set of video files. At step 806, the set of summarized video files is generated according to the generated degree of summarization for each video file. In an embodiment, a table may be maintained, such that, the table includes a mapping between multiple ranges of congestion level in a communication channel, degree of required summarization, and a corresponding summarized video file. In other words, for a given range of congestion, one degree of summarization may be specified.

Figure 9:
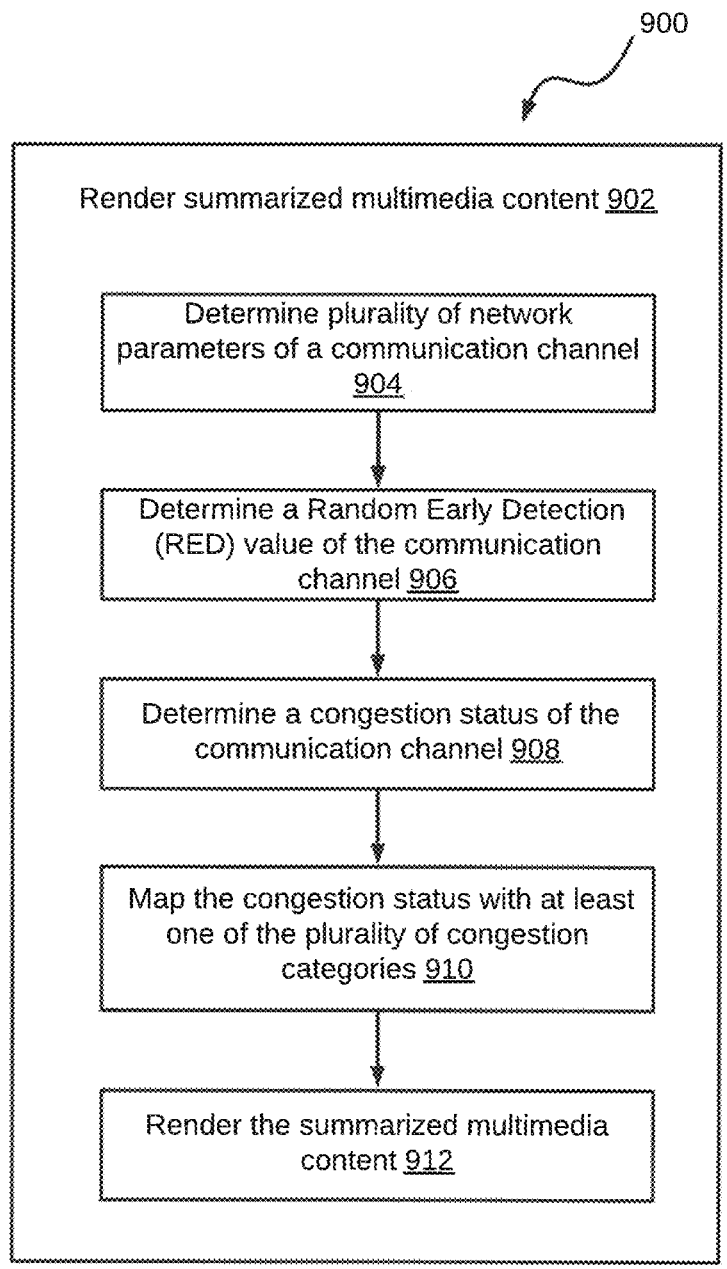
FIG. 9 illustrates a flowchart of a method for rendering summarized multimedia content on a device, in accordance with an embodiment.

Referring now to FIG. 9, a flowchart 900 of a method for rendering a summarized multimedia content on a device is illustrated, in accordance with an embodiment. At step 902, the summarized multimedia content is rendered on a device associated with a user. The rendering of the summarized multimedia content may further include steps 904, 906, 908, 910, and 912. At step 904, a plurality of network parameters of a communication channel being accessed by the device are determined. At step 906, a Random Early Detection (RED) value of the communication channel based on one or more of the plurality of network parameters. In an embodiment, the RED value may be determined by employing a deep learning model. The deep learning model may use any of an MLP technique, an LSTM technique, a CNN technique, or an RNN technique. At step 908, a congestion status of the communication channel is determined based on the determined RED value using the deep learning model. At step 910, the congestion status is mapped with one or more of the plurality of congestion categories. Based on the mapped congestion category, the summarized multimedia content is rendered at step 912.

Figure 10:
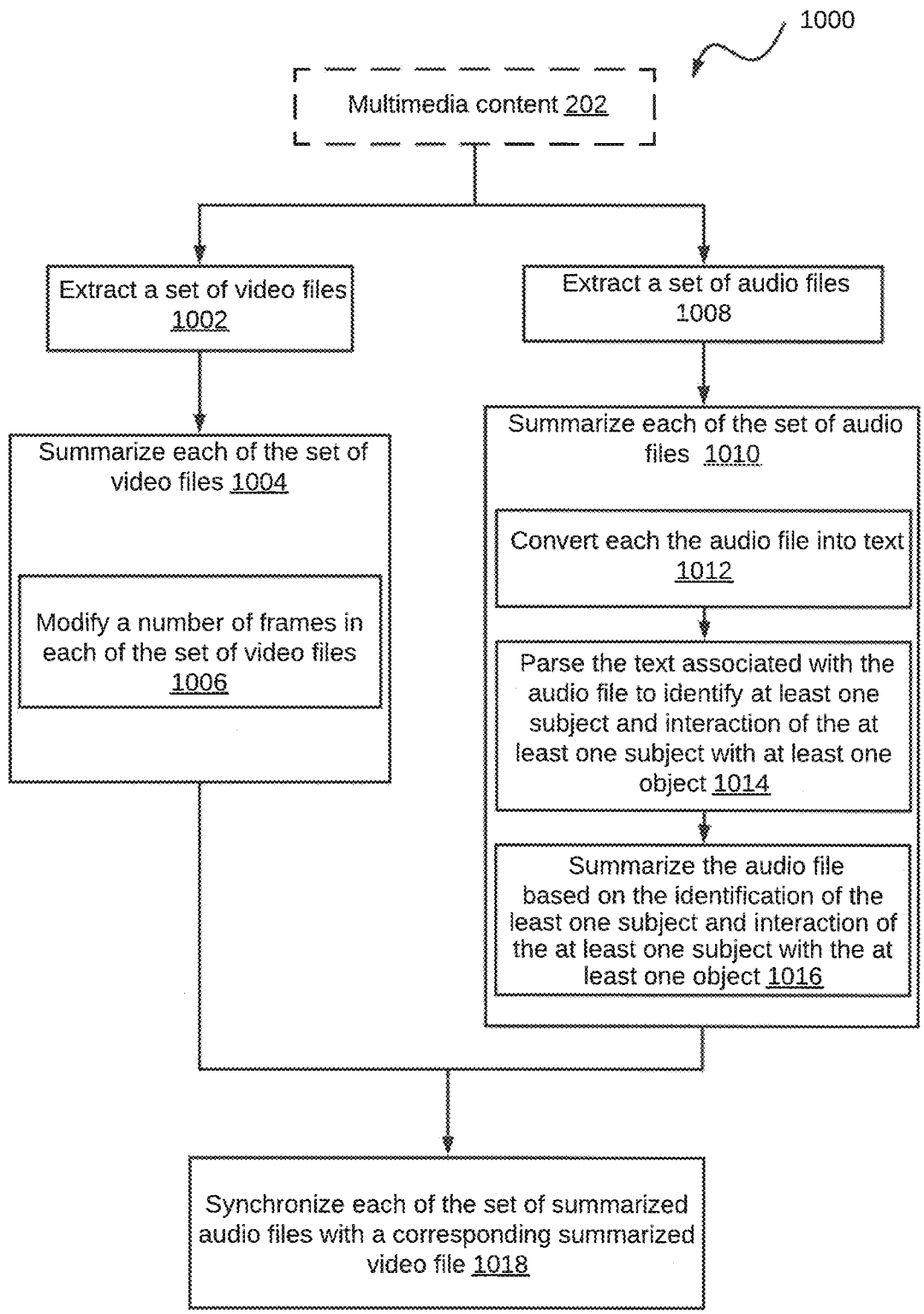
FIG. 10 illustrates a flowchart of a method for summarizing multimedia content, in accordance with another embodiment.

Referring now to FIG. 10, a flowchart 1000 of a method for summarizing multimedia content is illustrated, in accordance with another embodiment. At step 1002, the content summarization device 102 may extract a set of video files may be extracted from the multimedia content 202. At step 1004, the content summarization device 202 may summarize each of the set of video files to generate a set of summarized video files. The summarization of the set of video files, may further includes a step 1006, where the content summarization device 202 may modify a number of frames in each of the set of video files, such that modification in the number of frames of a video file from the set of video files retains a caption generated for the video file. This has already been explained in detail in conjunction with FIG. 2 and FIG. 3.

For summarization of the audio content, at step 1008, the content summarization device 202 may extract a set of audio files from the multimedia content 202. At step 1010, the content summarization device 202 may summarize each of the set of audio files in order to generate a set of summarized audio files. The summarization of audio content further includes steps 1012, 1014, and 1016. At step 1012, the content summarization device 202 may convert an audio file into text form, using a speech to text converter. At step 1014, the content summarization device 202 may parse the text associated with the audio file to identify one or more subjects and interaction of the one or more subjects with one or more objects, based on NLP techniques.

At step 1016, the content summarization device 202 may perform summarization of the audio file based on the identification of the one or more subjects and interaction of the one or more subjects with the one or more objects. The content summarization device 202 may perform step 1018 after completion of steps 1004 and 1010. At step 1018, the content summarization device 202 may synchronize each of the set of summarized audio files with a corresponding summarized video file from the set of summarized video files. The summarized audio file from the set of summarized audio files may define boundary of a corresponding summarized video file. This has already been explained in detail in conjunction with FIG. 7.

Figure 11:
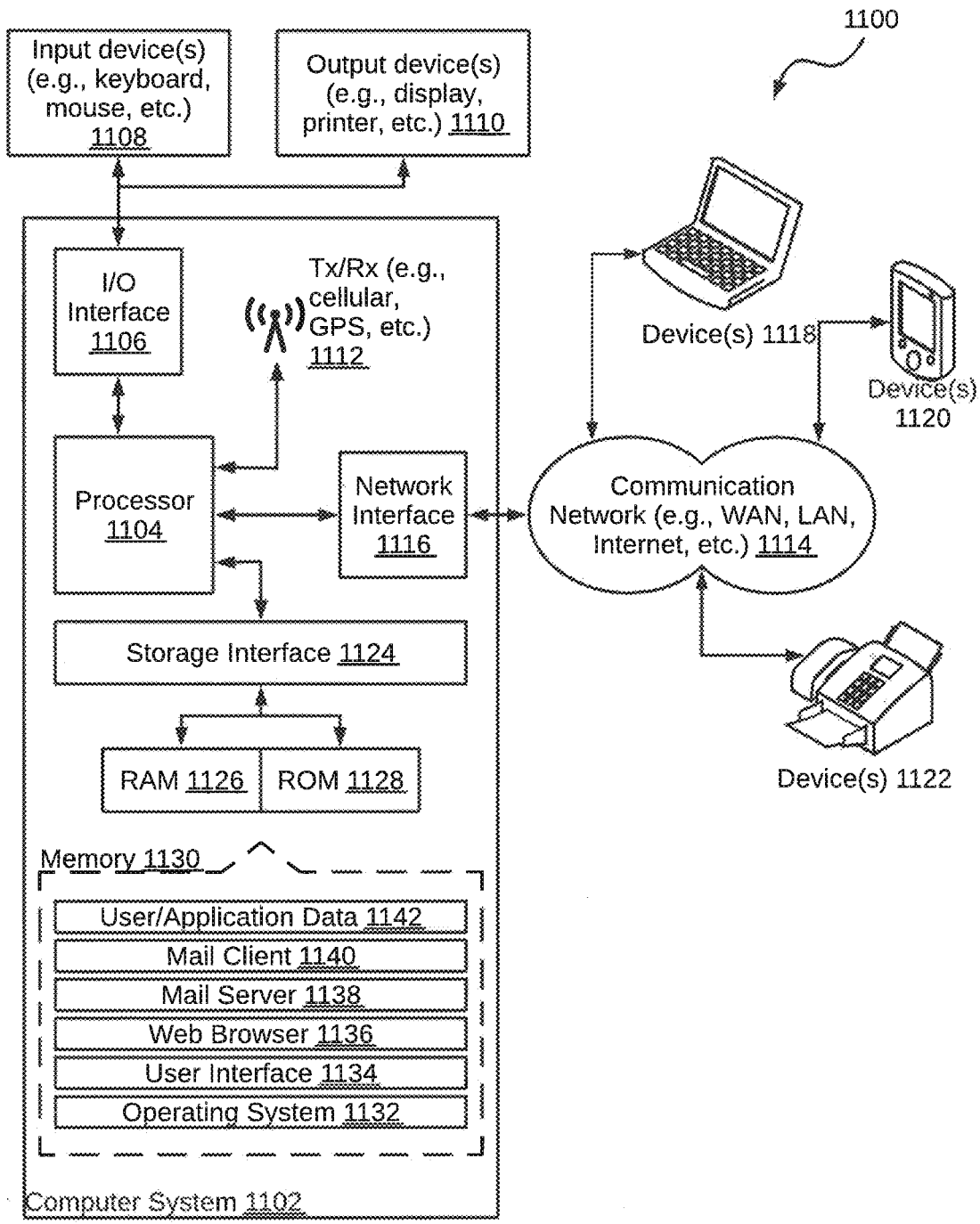
FIG. 11 illustrates a block diagram of an exemplary computer system for implementing embodiments consistent with the present disclosure.

The disclosed methods and systems may be Implemented on a conventional or a general-purpose computer system, such as a personal computer (PC) or server computer. Referring now to FIG. 11, a block diagram of an exemplary computer system 1102 for implementing various embodiments is illustrated. Computer system 1102 may include a central processing unit ("CPU" or "processor") 1104. Processor 1104 may include at least one data processor for executing program components for executing user or system-generated requests. A user may include a person, a person using a device such as such as those included in this disclosure, or such a device itself. Processor 1104 may include specialized processing units such as integrated system (bus) controllers, memory management control units, floating point units, graphics processing units, digital signal processing units, etc. Processor 1104 may include a microprocessor, such as AMD® ATHLON® microprocessor, DURON® microprocessor OR OPTERON® microprocessor, ARM's application, embedded or secure processors, IBM® POWERPC®, INTEL'S CORE® processor, ITANIUM® processor, XEON® processor, CELERON® processor or other line of processors, etc. Processor 1104 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1104 may be disposed in communication with one or more input/output (I/O) devices via an I/O interface 1106. I/O interface 1106 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (for example, code-division multiple access (CDMA), high-speed packet access (HSPA+), global system for mobile communications (GSM), long-term evolution (LTE), WiMax, or the like), etc.

Using I/O interface 1106, computer system 1102 may communicate with one or more I/O devices. For example, an input device 1108 may be an antenna, keyboard, mouse, joystick, (infrared) remote control, camera, card reader, fax machine, dongle, biometric reader, microphone, touch screen, touchpad, trackball, sensor (for example, accelerometer, light sensor, GPS, gyroscope, proximity sensor, or the like), stylus, scanner, storage device, transceiver, video device/source, visors, etc. An output device 1110 may be a printer, fax machine, video display (for example, cathode ray tube (CRT), liquid crystal display (LCD), light-emitting diode (LED), plasma, or the like), audio speaker, etc. In some embodiments, a transceiver 1112 may be disposed in connection with processor 1104. Transceiver 1112 may facilitate various types of wireless transmission or reception. For example, transceiver 1112 may include an antenna operatively connected to a transceiver chip (for example, TEXAS® INSTRUMENTS WILINK WL1286® transceiver, BROADCOM® BCM4550IUB80 transceiver, INFINEON TECHNOLOGIES® X-GOLD 618-PMB9800® transceiver, or the like), providing IEEE 802.6a/b/g/n, Bluetooth, FM, global positioning system (GPS), 2G/3G HSDPA/HSUPA communications, etc.

In some embodiments, processor 1104 may be disposed in communication with a communication network 1114 via a network interface 1116. Network interface 1116 may communicate with communication network 1114. Network interface 1116 may employ connection protocols including, without limitation, direct connect, Ethernet (for example, twisted pair 50/500/5000 Base T), transmission control protocol/internet protocol (TCP/IP), token ring, IEEE 802.11a/b/g/n/x, etc. Communication network 1114 may include, without limitation, a direct interconnection, local area network (LAN), wide area network (WAN), wireless network (for example, using Wireless Application Protocol), the Internet, etc. Using network interface 1116 and communication network 1114, computer system 1102 may communicate with devices 1118, 1120, and 1122. These devices may include, without limitation, personal computer(s), server(s), fax machines, printers, scanners, various mobile devices such as cellular telephones, smartphones (for example, APPLE® IPHONE® smartphone, BLACKBERRY® smartphone, ANDROID® based phones, etc.), tablet computers, eBook readers (AMAZON® KINDLE® ereader, NOOK® tablet computer, etc.), laptop computers, notebooks, gaming consoles (MICROSOFT® XBOX® gaming console, NINTENDO® DS® gaming console, SONY® PLAYSTATION® gaming console, etc.), or the like. In some embodiments, computer system 1102 may itself embody one or more of these devices.

In some embodiments, processor 1104 may be disposed in communication with one or more memory devices (for example, RAM 1126, ROM 1128, etc.) via a storage interface 1124. Storage interface 1124 may connect to memory 1130 including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

Memory 1130 may store a collection of program or database components, including, without limitation, an operating system 1132, user interface application 1134, web browser 1136, mail server 1138, mail client 1140, user/application data 1142 (for example, any data variables or data records discussed in this disclosure), etc. Operating system 1132 may facilitate resource management and operation of computer system 1102. Examples of operating systems 1132 include, without limitation, APPLE® MACINTOSH® OS X platform, UNIX platform, Unix-like system distributions (for example, Berkeley Software Distribution (BSD), FreeBSD, NetBSD, OpenBSD, etc.), LINUX distributions (for example, RED HAT®, UBUNTU®, KUBUNTU®, etc.), IBM® OS/2 platform, MICROSOFT® WINDOWS® platform (XP, Vista/7/8, etc.), APPLE® IOS® platform, GOOGLE® ANDROID® platform, BLACKBERRY® OS platform, or the like. User interface 1134 may facilitate display, execution, interaction, manipulation, or operation of program components through textual or graphical facilities. For example, user interfaces may provide computer interaction interface elements on a display system operatively connected to computer system 1102, such as cursors, icons, check boxes, menus, scrollers, windows, widgets, etc. Graphical user interfaces (GUIs) may be employed, including, without limitation, APPLE® Macintosh® operating systems' AQUA® platform, IBM® OS/2® platform, MICROSOFT® WINDOWS® platform (for example, AERO® platform, METRO® platform, etc.), UNIX X-WINDOWS, web interface libraries (for example, ACTIVEX® platform, JAVA® programming language, JAVASCRIPT® programming language, AJAX® programming language, HTML, ADOBE® FLASH® platform, etc.), or the like.

In some embodiments, computer system 1102 may implement a web browser 1136 stored program component. Web browser 1136 may be a hypertext viewing application, such as MICROSOFT® INTERNET EXPLORER® web browser, GOOGLE® CHROME® web browser, MOZILLA® FIREFOX® web browser, APPLE® SAFARI® web browser, etc. Secure web browsing may be provided using HTTPS (secure hypertext transport protocol), secure sockets layer (SSL), Transport Layer Security (TLS), etc. Web browsers may utilize facilities such as AJAX, DHTML, ADOBE® FLASH® platform, JAVASCRIPT® programming language, JAVA® programming language, application programming interfaces (APIs), etc. In some embodiments, computer system 1102 may implement a mail server 1138 stored program component. Mail server 1138 may be an Internet mail server such as MICROSOFT® EXCHANGE® mail server, or the like. Mail server 1138 may utilize facilities such as ASP, ActiveX, ANSI C+-F/C #, MICROSOFT .NET® programming language, CGI scripts, JAVA® programming language, JAVASCRIPT® programming language, PERL® programming language, PHP® programming language, PYTHON® programming language, WebObjects, etc. Mail server 1138 may utilize communication protocols such as internet message access protocol (IMAP), messaging application programming interface (MAPI), Microsoft Exchange, post office protocol (POP), simple mail transfer protocol (SMTP), or the like. In some embodiments, computer system 1102 may implement a mail client 1140 stored program component. Mail client 1140 may be a mail viewing application, such as APPLE MAIL® mail client, MICROSOFT ENTOURAGE® mail client, MICROSOFT OUTLOOK® mail client, MOZILLA THUNDERBIRD® mail client, etc.

In some embodiments, computer system 1102 may store user/application data 1142, such as the data, variables, records, etc. as described in this disclosure. Such databases may be implemented as fault-tolerant, relational, scalable, secure databases such as ORACLE® database OR SYBASE® database. Alternatively, such databases may be implemented using standardized data structures, such as an array, hash, linked list, struct, structured text file (for example, XML), table, or as object-oriented databases (for example, using OBJECTSTORE® object database, POET® object database, ZOPE® object database, etc.). Such databases may be consolidated or distributed, sometimes among the various computer systems discussed above in this disclosure. It is to be understood that the structure and operation of the any computer or database component may be combined, consolidated, or distributed in any working combination.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Various embodiments disclose methods and systems for summarizing multimedia content. The proposed method ensures consistent quality. Thus, irrespective of contention for resources, the quality of video consumed by the end user is always high and the quality does not deteriorate. There is selective omission of content. Thus, unlike conventional systems, the redundant content is heavily summarized to minimize usage of resources. The method also provides dynamic summarization, which is done based on available bandwidth. Last, but not the least, the method provides proactive summarization, which is done proactively based on available bandwidth in near future The specification has described method and system for summarizing multimedia content. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for summarizing multimedia content, the method comprising:
   extracting, by a content summarization device, a set of video files from a multimedia content, wherein each of the set of video files comprises a plurality of frames;
   summarizing, by the content summarization device, each of the set of video files to generate a set of summarized video files, wherein summarizing the set of video files comprises modifying a number of frames in each of the set of video files, and wherein modifying the number of frames in a video file from the set of video files retains a caption generated for the video file;
   generating, by the content summarization device, sets of bridge frames for the set of summarized video files, based on a deep learning model, wherein a set of bridge frames from the sets of bridge frames maintains continuity between corresponding adjacent summarized video files; and
   generating, by the content summarization device, a summarized multimedia content based on the set of summarized video files and the sets of bridge frames.

2. The method of claim 1, further comprising:
   retrieving the multimedia content from one of a plurality of sources; and
   splitting the multimedia content into audio content and video content based on a time stamp mapping technique.

3. The method of claim 2, wherein extracting the set of video files comprises:
   iteratively determining at least one change in context of the video content based on comparison of adjacent frames within the video content, wherein the change in context corresponds to difference between adjacent frames being greater than a predefined threshold; and
   extracting a video file from the video content at each of the at least one change in context in the video content to create the set of video files.

4. The method of claim 2, further comprising:
   extracting a set of audio files from the audio content; and
   summarizing each of the set of audio files to generate a set of summarized audio files, wherein summarizing an audio file from the set of audio files comprises:
   converting each the audio file into text;
   parsing the text associated with the audio file to identify at least one subject and interaction of the at least one subject with at least one object, based on natural language processing techniques; and
   summarizing the audio file based on the identification of the least one subject and interaction of the at least one subject with the at least one object.

5. The method of claim 4, further comprising synchronizing each of the set of summarized audio files with a corresponding summarized video file from the set of summarized video files, wherein a summarized audio file from the set of summarized audio files defines boundary of a corresponding summarized video file.

6. The method of claim 1, wherein summarizing each of the set of video files to generate a set of summarized video files comprises further comprising:
   determining a plurality of congestion categories for a communication channel, wherein each of the plurality of congestion categories correspond to at least one congestion status of the communication channel;
   evaluating, for each of the plurality of congestion categories, a degree of summarization required for each of the set of video files; and
   generating, for each of the plurality of congestion categories, the set of summarized video files based on the associated degree of summarization.

7. The method of claim 6 further comprising rendering the summarized multimedia content on a device associated with a user.

8. The method of claim 7, wherein rendering comprises:
   determining a plurality of network parameters of a communication channel being accessed by the device;
   determining a Random Early Detection (RED) value of the communication channel based on the plurality of network parameters;
   determining a congestion status of the communication channel based on the determined RED value using the deep learning model;
   mapping the congestion status with at least one of the plurality of congestion categories; and
   rendering the summarized multimedia content based on the mapped congestion category.

9. The method of claim 1, wherein generating the summarized multimedia content comprises interleaving each of the sets of bridge frames between the corresponding adjacent summarized video files from the set of summarized video files.

10. The method of claim 1, wherein modifying the number of frames in a video file from the set of video files comprises at least one of:
    iteratively removing at least one frame starting from the last frame in the video file, wherein the at least one frame are removed iteratively till the caption associated with the video file is maintained; and
    iteratively adding at least one frame to create the video file, wherein the at least one frame is iteratively added till the caption associated with the video file is generated.

11. The method of claim 1, wherein the deep learning model comprises at least one of a multilayer perceptron (MLP) model, a long short-term memory (LSTM) model, a convolutional neural network (CNN) model, a recursive neural network (RNN) model, or a recurrent neural network (RNN) model.

12. A method for summarizing multimedia content, the method comprising:
extracting, by a content summarization device, a set of video files and a corresponding set of audio files from a multimedia content, wherein each of the set of video files comprises a plurality of frames;
summarizing, by the content summarization device, each of the set of video files to generate a set of summarized video files and each of the set of audio files to generate a set of summarized audio files,
wherein summarizing the set of video files comprises modifying a number of frames in each of the set of video files, and wherein modifying the number of frames in a video file from the set of video files retains a caption generated for the video file, and
wherein summarizing an audio file from the set of audio files comprises:
converting each the audio file into text;
parsing the text associated with the audio file to identify at least one subject and interaction of the at least one subject with at least one object, based on natural language processing techniques; and
summarizing the audio file based on the identification of the least one subject and interaction of the at least one subject with the at least one object;
synchronizing, by the content summarization device, each of the set of summarized audio files with a corresponding summarized video file from the set of summarized video files, wherein a summarized audio file from the set of summarized audio files defines boundary of a corresponding summarized video file.

13. The method of claim 12, further comprising adding at least one frame to a summarized video file from the set of summarized video file to match boundary of a corresponding summarized audio file from the set of summarized audio files.

14. A system for summarizing multimedia content, the system comprising:
a processor; and
a memory communicatively coupled to the processor, wherein the memory stores processor instructions, which, on execution, causes the processor to:
extract a set of video files from a multimedia content, such that each of the set of video files comprises a plurality of frames;
summarize each of the set of video files to generate a set of summarized video files, such that summarizing the set of video files comprises modifying a number of frames in each of the set of video files, and wherein modifying the number of frames in a video file from the set of video files retains a caption generated for the video file;
generate sets of bridge frames for the set of summarized video files, based on a deep learning model, such that a set of bridge frames from the sets of bridge frames maintains continuity between corresponding adjacent summarized video files; and
generate a summarized multimedia content based on the set of summarized video files and the sets of bridge frames.

15. The system of claim 14, wherein the processor instructions further cause the processor to:
retrieve the multimedia content from one of a plurality of sources; and
split the multimedia content into audio content and video content based on a time stamp mapping technique.

16. The system of claim 15, wherein the processor instructions further cause the processor to:
iteratively determine at least one change in context of the video content based on comparison of adjacent frames within the video content, such that the change in context corresponds to difference between adjacent frames being greater than a predefined threshold; and
extract a video file from the video content at each of the at least one change in context in the video content to create the set of video files.

17. The system of claim 15, wherein the processor instructions further cause the processor to:
extract a set of audio files from the audio content; and
summarize each of the set of audio files to generate a set of summarized audio files, wherein summarizing an audio file from the set of audio files comprises:
convert each the audio file into text;
parse the text associated with the audio file to identify at least one subject and interaction of the at least one subject with at least one object, based on natural language processing techniques; and
summarize the audio file based on the identification of the least one subject and interaction of the at least one subject with the at least one object.

18. The system of claim 15, wherein the processor instructions further cause the processor to synchronize each of the set of summarized audio files with a corresponding summarized video file from the set of summarized video files, wherein a summarized audio file from the set of summarized audio files defines boundary of a corresponding summarized video file.

19. The system of claim 14, wherein the processor instructions further cause the processor to:
determine a plurality of congestion categories for a communication channel, wherein each of the plurality of congestion categories correspond to at least one congestion status of the communication channel;
evaluate, for each of the plurality of congestion categories, a degree of summarization required for each of the set of video files; and
generate, for each of the plurality of congestion categories, the set of summarized video files based on the associated degree of summarization.

20. The system of claim 19, wherein the processor instructions further cause the processor to render the summarized multimedia content on a device associated with a user.

21. The system of claim 20, wherein the processor instructions further cause the processor to:
determine a plurality of network parameters of a communication channel being accessed by the device;
determine a Random Early Detection (RED) value of the communication channel based on the plurality of network parameters;
determine a congestion status of the communication channel based on the determined RED value using the deep learning model;
map the congestion status with at least one of the plurality of congestion categories; and
render the summarized multimedia content based on the mapped congestion category.

22. The system of claim 14, wherein generating the summarized multimedia content comprises interleaving each of the sets of bridge frames between the corresponding adjacent summarized video files from the set of summarized video files.

23. The system of claim 14, wherein the processor instructions further cause the processor to:
- iteratively remove at least one frame starting from the last frame in the video file, wherein the at least one frame are removed iteratively till the caption associated with the video file is maintained; and
- iteratively add at least one frame to create the video file, wherein the at least one frame is iteratively added till the caption associated with the video file is generated.

* * * * *